W. W. CULPEPPER.
Car Coupling.
No. 28,660.
Patented June 12, 1860.
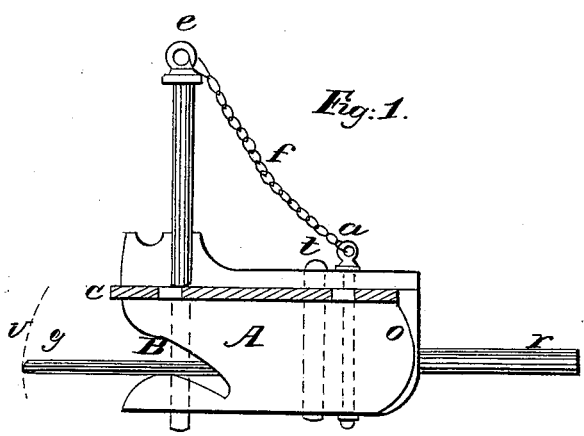
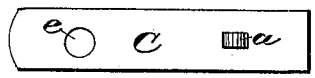
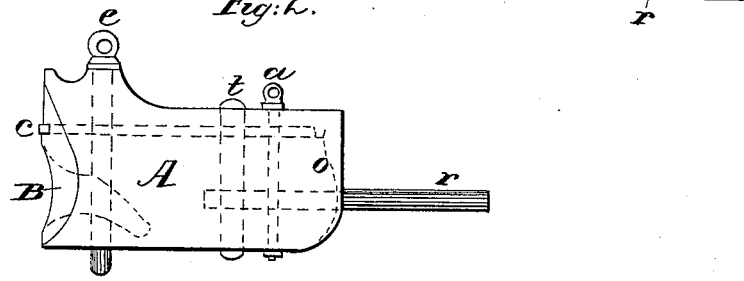
Witnesses
William E Brown
E. H. Brown
Inventor
William W. Culpepper

UNITED STATES PATENT OFFICE.

WM. W. CULPEPPER, OF AUGUSTA, GEORGIA.

CAR-COUPLING.

Specification of Letters Patent No. 28,660, dated June 12, 1860.

*To all whom it may concern:*

Be it known that I, WILLIAM W. CULPEPPER, of Augusta, in the county of Richmond and State of Georgia, have invented a new and Improved Car-Bumper; and I do hereby declare that the following is a full and exact description of the same, reference being had to the accompanying drawings and to the letters of reference marked thereon.

The nature of my invention consists in the providing of a self-coupling bumper for railroad cars which shall act with certainty and prevent those numerous accidents which occur in the act of coupling trains of cars.

I construct my bumper head very nearly in the form now generally in use, making it somewhat longer and a little deeper. Through the length of the head and just above the opening to receive the coupling link is a mortise of about three inches in width and a half inch thick. This mortise extends through the whole length of the head of the bumper. In this is a light iron plate $c$, so fitted as to move easily and has a hole in it to correspond with the hole in the bumper for the coupling pin. At the other end of the bumper there is a slot cut in the plate through which is a bolt, this acts as a stop to the plate.

At the back end of the bumper I place the spring $o$, which is attached to the bumper by means of the bolt $a$, which passes through the plate $c$. This spring acts on the plate in such a manner that when the coupling pin is removed the plate $c$, is pushed forward, so as to pass under the bottom of the coupling pin $e$, and keep it in the position shown on Fig. 1. The pin $e$, is connected with the bolt $a$, by means of a chain in such manner that the coupling pin cannot be entirely removed but must always remain in the proper position for coupling.

When the bumpers of two cars strike in the act of coupling the plate $c$, is pushed from under the pin which immediately falls into its place. The throat B, of the bumper is so constructed that the coupling link $s$, can be elevated or lowered to suit the irregularities in the heights of the cars by drawing out or pushing in the link.

The bumper rods are either cast in the bumper or fastened with keys, this latter preserves the bumper when the rods are broken.

Figure 1, is a section of the bumper; A, the bumper; $r$, the bumper rods; $t$, the key by which the rod is fastened; $c$, the sliding plate; $a$, the check bolt; $o$, the spring; $e$, the coupling pin; $s$, the coupling link, and B, the throat of the bumper; the dotted arc, $u$, the radius in which the coupling link will move; $f$, the pin chain. Fig. 2, is an elevation of the bumper with the coupling pin $e$, in its place when coupled the parts same as Fig. 1. Fig. 3, a view of the plate $c$, showing the slot for the stop bolt $a$, and the coupling pin $e$. Fig. 4, one of the bumper rods $r$, and the place for the key $t$.

What I claim as my invention and desire to secure by Letters Patent is—

The peculiar form of throat B, combined with the sliding plate $c$, spring $o$, stop bolt $a$, bumper rods $r$, and keys $t$, arranged and operating with bumper A and link $s$ as and for the purpose set forth.

WILLIAM W. CULPEPPER.

Witnesses:
WILLIAM E. BROWN,
E. W. BROWN.